(12) United States Patent
Godager

(10) Patent No.: US 9,310,510 B2
(45) Date of Patent: Apr. 12, 2016

(54) METHOD AND APPARATUS FOR IN-SITU WELLBORE MEASUREMENT AND CONTROL WITH INDUCTIVE CONNECTIVITY

(75) Inventor: Oivind Godager, Sandefjord (NO)

(73) Assignee: Sensor Developments AS, Sandefjord (NO)

( * ) Notice: Subject to any disclaimer, the term of this patent is extended or adjusted under 35 U.S.C. 154(b) by 959 days.

(21) Appl. No.: 13/513,825

(22) PCT Filed: Nov. 30, 2010

(86) PCT No.: PCT/GB2010/002203
§ 371 (c)(1),
(2), (4) Date: Jan. 18, 2013

(87) PCT Pub. No.: WO2011/067558
PCT Pub. Date: Jun. 9, 2011

(65) Prior Publication Data
US 2013/0110402 A1  May 2, 2013

(30) Foreign Application Priority Data
Dec. 4, 2009  (GB) .................................. 0921341.1

(51) Int. Cl.
*G01V 3/26*  (2006.01)
*G01V 3/38*  (2006.01)
(Continued)

(52) U.S. Cl.
CPC ................ *G01V 3/38* (2013.01); *E21B 47/122* (2013.01); *G01V 3/20* (2013.01); *G01V 3/26* (2013.01); *G01V 5/04* (2013.01); *G01V 9/00* (2013.01); *G01V 9/002* (2013.01); *G01V 9/005* (2013.01); *G01V 9/02* (2013.01)

(58) Field of Classification Search
CPC ........... G01V 9/00; G01V 9/002; G01V 9/02; G01V 3/20; G01V 3/26; G01V 3/38; E21B 47/00; E21B 47/06; E21B 47/12; E21B 47/122
See application file for complete search history.

(56) References Cited

U.S. PATENT DOCUMENTS

| 6,768,700 B2 * | 7/2004 | Veneruso et al. .............. 367/81 |
| 2001/0027865 A1 | 10/2001 | Wester |
| 2005/0115708 A1 | 6/2005 | Jabusch |

FOREIGN PATENT DOCUMENTS

| GB | 2466861 A | 7/2010 |
| GB | 2466862 | 7/2010 |

OTHER PUBLICATIONS

International Search Report from PCT/GB2010/002203 issued May 10, 2011.
(Continued)

*Primary Examiner* — Toan Le

(57) ABSTRACT

An apparatus and method for in-situ wellbore measurements wherein the apparatus includes one or more sensors arranged outside a wellbore, one or more actuators associated with the sensors, a wireless instrument unit situated outside the non-magnetic portion of wellbore conduit, and an electromagnetic transceiver situated inside a non-magnetic portion of wellbore conduit and mounted on an electric-line logging cable, each of the wireless instrument unit and the transceiver have a transmission antenna and a spaced apart receiver antenna, each transmission antenna disposed to be positioned to oppose through the non-magnetic casing a receiver antenna to form a phase-locked loop that verifies the relative positions of the transceiver and wireless instrument unit.

22 Claims, 5 Drawing Sheets

(51) Int. Cl.
*E21B 47/12* (2012.01)
*G01V 3/20* (2006.01)
*G01V 5/04* (2006.01)
*G01V 9/00* (2006.01)
*G01V 9/02* (2006.01)

(56) References Cited

OTHER PUBLICATIONS

Great Britain Search Report from GB0921341.4 issued Feb. 9, 2011.

* cited by examiner

METHOD AND APPARATUS FOR IN-SITU WELLBORE MEASUREMENT AND CONTROL WITH INDUCTIVE CONNECTIVITY

BACKGROUND OF THE INVENTION

Field of the Invention

The present invention relates generally to a method and apparatus for in-situ wellbore measurements for the monitoring and control of oil and gas production, injection, and observation wells, and more particularly to a method and apparatus to monitor and control wellbore and formation parameters in-situ from an electromagnetic intervention tool operated inside the wellbore completion.

The management of oil and gas as well as storage type reservoirs constitutes an on-going concern of the petroleum industry. Those concerns are mainly due to the enormous monetary expenses involved in materializing any type of petroleum well, as well as the risks associated with workover and recompletion operations. Herein, a petroleum type well is defined as any type of well being drilled and equipped for the purpose of producing or storage of hydrocarbon fractures from/to subsurface formations. Further, petroleum type wells are categorized as any of, or any combination of, storage, observation, producing, or injection type wells.

Modern reservoir management systems more and more look into the advancement of including measurement and control apparatus on the outside and along a wellbore conduit. For example, in a multilateral wellbore completion, one or more formation zones are produced into the same wellbore conduit. Thus, the prospect monitoring and control has become more complex than was previously the case, and has generated the need for remote and cordless downhole instrumentation.

Further, the motivation to fully understand the physical properties and geometry of a reservoir or formation in the long-term contributes to added lifetime as well as productivity. There are numerous formation parameters that may be of interest if sensor technology was available that was capable of looking into the formation side of the wellbore conduit or casing.

SUMMARY OF THE INVENTION

By means of inductive connectivity, wireless sensors and actuators are installed behind the wellbore conduit or production liner, without the need for a cable or cord to power and communicate and without compromising the pressure integrity of the well or the well design in any way. The present invention leads to better control and interpretation of process and formation parameters since sensors and actuators are remote and are placed in direct contact with the process or investigation zone of interest. Moreover, the apparatus involved enables parameters to be measured inside and outside of the wellbore conduit simultaneously. The closeness of the apparatus to the formation and the overall performance of this type of data acquisition enable the user to better distinguish whether a change in physical parameter measured is caused by a change of the physical parameter itself, or whether it is caused by noise or by interference from the process system, or simply by environmental fluctuations. By the use of inductive connectivity sensors and actuators, the need for electrical interconnecting cable and control lines attached to wellbore conduit or completions is eliminated, making the present invention a direct risk reducer.

The invention also includes telemetry for the communication from surface to downhole as well as a combined "power harvesting" and telemetry device for communicating with the remote sensor/actuator unit that is located behind the wellbore conduit. The surface-to-downhole power and telemetry link enables the ability to monitor and control numerous sensor/actuator units in-situ within one and the same wellbore.

The apparatus and technology proposed applies to any type of formation measurements, such as resistivity, multi-axes seismic, radiation, pressure, temperature, conductivity, electric field, magnetic field, capacitance, chemical means, water saturation, and contacts, to mention a few non-limiting examples. Furthermore, for the wellbore process application, the measurement and control of parameters such as flow rate and direction, flow composition, flow valve position and actuation, and pressure, temperature and temperature profile, thermal conductivity, sand content, turbidity, water content and level, as well as the controlling of downhole artificial gas lift valves is important.

For the purpose of this invention a specific process control and monitor application has been chosen in order to display the features and functionality of the present invention. Thus, the process example for the continuing discussion is the ability to monitor a zonal formation pressure of a multilateral well. The well completion is "smart type," and provides apparatus and configuration to control and evaluate production from each of the producing zones. Thus, the application is of the multi sensor/actuator deployment type, and requires that sensors and actuators are attached to the final elements and placed on the outside of the wellbore conduit. Since no cables or control lines are used for interconnecting the downhole instrumentation, nor attached to the producing tubing to the surface, the installation and risk associated with the installation is greatly reduced.

Generally, all control and access of the petroleum well is provided through its wellhead. The present invention has applications to any petroleum-type wells, located on land, on platforms, or at seabed. However, for simplicity and to facilitate uniform understanding of the present invention, it is described herein particularly as it relates to a generic type petroleum well and its wellhead.

There are numerous prior art patents related to the measurement of parameters outside the wellbore conduit or well casing annuli. One system is described in U.S. Pat. No. 6,513,596, to Wester. The system described by the Wester Patent is illustrative and shows a well data monitoring system with sensors placed inside the outer annuli of a well casing program. The system is a non-intrusive approach to measure pressure and other parameters within a plurality of annuli spaces and preserves the pressure containing integrity of the well. The system shows sensors placed inside the annuli that communicate with an interrogation system located externally or internally of the Wellhead Housing. The system acknowledges that sensors will require power and communication to perform their operation, and generally lists alternative sources to power and methods of communication, without solving the actual challenges of how to implement it in a real world application. This method is not believed to have been installed in any petroleum well or field.

Another related approach is described by U.S. Pat. No. 7,703,515, to Chouzenoux et al. The method described by this reference is magnetically saturating the well casing or conduit to make a "window" for operating a local AC magnetic field to excite a sensor located outside a casing. The principle described therein is not considered realistic due to the relatively high power consumption required to magnetically saturate the well casing. Further, the method would require uniform current flux within the material to be saturated, which in turn would require optimum contact (evenly distributed contact resistance over the exposed area) performance of the electrodes implied. Due to a combination of exposed electrodes and high currents, such a system would rapidly degrade due to galvanic reactions (oxidation/corrosion) inside the pressure containment system of a well. Thus, this method is considered non-applicable for a prescribed wellbore measurement and control application due to its exposed electrodes and the high current density required to magnetically saturate the wellbore casing permanently. Further, it is not illustrated (nor is it believed) that this method and apparatus would work in a multi-sensor configuration since it does not provide a common infrastructure to enable placement of in-situ wellbore sensors and actuators at different zones of investigation or control means, as the present invention does.

According to the present invention, there is provided apparatus for in-situ wellbore measurements, the apparatus comprising one or more sensors arranged outside a wellbore, one or more actuators associated with the sensors, an electromagnetic transceiver situated inside a non-magnetic portion of wellbore conduit and mounted on an electric-line logging cable, and a downhole intervention tool also located on the electric-line cable for controlling communication to the apparatus.

The invention also extends to a method of in-situ wellbore measurements in which apparatus according to the present invention is placed within a wellbore, a signal is provided to induce an electromagnetic transmission from the electromagnetic transceiver to the downhole intervention tool, if the downhole intervention tool is aligned with the electromagnetic transceiver, a signal is sent to the electromagnetic transceiver closing the loop, the activated sensor and actuator unit measures the predetermined property and records the data, the data is transferred wirelessly to the electromagnetic transceiver unit, and the data is optionally further processed and sent wirelessly out of the wellbore.

Preferred and optional features of the invention will be clear from the accompanying claims and from the detailed description of an exemplary embodiment as set out below.

A primary aspect of the present invention is to provide a method and apparatus to obtain in-situ wellbore measurements and control. In certain applications, it is required to place sensors and actuators behind the wellbore conduit. To achieve this, the need to establish a wireless link for power and communication across the wellbore conduit is required. Traditionally, sensors have been placed behind the conduit by the use of traditional cable of which the latter provides for power and communication for the instrumentation. Relating to prior art, the need of the "cable" has been a "bottleneck" and a showstopper in order to place instrumentation directly facing a formation or an investigation zone of interest. However, numerous attempts have been made utilizing cable and penetrations in well completion and casing programs but are non-featured since they are complex, they compromise the pressure integrity of the well barriers, and they add to the risk assessment related to handling and protection of the cable in the well.

The present invention discloses a non-intrusive method that preserves the pressure integrity of the well at the same time as it allows remote sensors and actuators to be placed behind the wellbore casing or conduit. Another important feature of the method and apparatus of this invention is that it allows a cluster of sensor and actuator systems to be mounted and operated on the same wellbore conduit using the same intervention tool and control from the surface.

A second aspect of the invention is that the remote sensors and actuators placed in the wellbore may be provided with an alternative energy source and thereby become autonomous. The energy source in such an application may utilize a primary or secondary source battery, a super capacitor, a downhole generator, or a combination thereof. Upon well intervention, a logging tool may be used to correct set-points and alter sensor and actuator settings, as well as to download historical data. For the latter, data may be recorded at any sensor/actuator level, and it may be recorded with time or event. For example, in a pressure sensing application, the pressure measuring apparatus has a built-in memory and a sequenced recording function with time or event. By intervention, using a logging tool, the recorded data is wirelessly transferred to the logging tool and the surface equipment.

In accordance with a first aspect of the present invention, a Wireless Instrument Unit ("WIU") is provided. The WIU is a non-intrusive in-situ instrument apparatus provided for monitoring and control of wellbore parameters. A feature of the WIU is that it contains a Sensor/Actuator Package ("SAP") that for the purpose of illustrating this invention consists of remote instrumentation to permanently monitor pressure/temperature as well as control of a flow Valve, all of which are performed without compromising any of the integrity of the wellbore conduit in any way. The exemplary SAP application is specific, and consists of a set of highly accurate quartz pressure and temperature sensor crystals and outputs pressure and temperature, as well as temperature gradients (i.e., change).

For the valve control application, the valve may be interrogated and operated to any position between open and closed and the actual valve position be fed back to the system for evaluation. For interrogation means, the WIU and SAP are inductively connected to an intervention tool apparatus operated at an Electric-line Cable ("ELC"). The intervention tool and apparatus is named an Electromagnetic Transceiver ("ET") which includes circuitry for inductive connectivity of the WIU. By means of this inductive connectivity, wireless bridging provides two-way communication and power for the WIU and SAP. To provide optimum efficiency of the connectivity the WIU and SAP is attached or integrated to the outer perimeter of a Non-Magnetic Wellbore Conduit ("NMWC") which is part of the well completion program (the process system).

A second aspect of the present invention is the Electromagnetic Transceiver ("ET") and is typically either part of or attached to an Electric-line Cable. The ET is adapted to host the Wireless Instrument Unit. The ET consists of two main elements. The first and main element of the ET is an Electromagnetic Armature ("EA"), and the second element of the ET is a Cable Adaptor (CA). The EA provides as a combination both the power source and the communications link for the WIU. The principle of the EA is by low frequency induction or electromagnetic ("EM") means, which is picked up and converted to electric energy by the WIU. To ensure optimum operating conditions for the remote WIU during interrogation by the ET, both units are provided with an application specific antenna device, which enhance the facility to "fine tune" the efficiency of the inductive connectivity.

Both the ET and WIU are split into two separate and equal sections, that are opposed to each other when aligned in the wellbore. One section is the transmit antenna Tx and the second section is a rectenna Rx or Receive Antenna. More particularly, the alignment of the unit or antenna is performed by tracking of an electronic phase-locked loop that is part of the ET. During a well intervention, the ET is run in a continuous transmit mode. In operation, the transmit antenna of the ET induces an alternating electromagnetic field at a particular frequency W, which will be recognized by a matching (pre-programmed) WIU. Thus, as the ET is aligned with the WIU, the transmit field is picked up by the WIU receiving antenna and, if the received frequency matches its expectation, it is evoked and will transmit a feedback signal using it's transmit antenna. In turn, as the feedback is picked up by the ET rectenna, the loop is closed as the feedback match and tracks the transmittal of the phase-locked loop. Upon "track," it is meant that the ET is opposed to a "keyed" or addressed WIU, of which when the address signal is recognized, the ET will transmit a PLL acknowledgement signal via the electric line cable to alert the operator of the unit alignment.

Furthermore, and for the purpose of the invention, a keying or addressing architecture is derived by utilizing a plurality of transmission frequencies. Vice-versa, the frequency keying may be used to evoke a plurality of remote WIU's for each of which the response is correspondingly frequency specific.

During the run-in mode of the ET, the "fine-tuning" is performed by vertical alignment of the ET versus the WIU. For the purpose of this invention, the final alignment of the ET versus the WIU in the wellbore is done by controlling a winch and a downhole cable based on observation of the tracking of the PLL acknowledgement signal as transmitted by the ET phase-locked loop.

Also attached to the ET is a Cable Adaptor ("CA") connecting the control or electric line cable ("ELC") to the ET. The control cable or ELC is run into and inside the wellbore conduit or the completion tubing and exits the well through the wellhead, as is known in the art. In highly deviated wells the ET may be run as part of a well tractor operation, which is also known in the art. Typically, the control cable is a single-conductor armored cable type. This cable provides power and two-way communication to the ET. In turn, and upon track of a remote WIU, the ET provides connectivity of the WIU and is the main link transmitting data to and from the WIU and the top-site monitoring facilities (i.e., outside the well).

Depending on the type and the conditions to provide a particular wellbore measurement, the ET may include a Sensor/Actuator Package ("SAP") equal to or different from that of the WIU to enhance more complex data acquisition to interpret wellbore measurements as well as control means.

The above-discussed and other features and advantages of the present invention will be appreciated and understood by those skilled in the art from the detailed description and drawings.

DESCRIPTION OF THE DRAWINGS

Referring now to the drawings, wherein like elements are numbered alike in the several FIGS..

DETAILED DESCRIPTION OF THE PREFERRED EMBODIMENT

This invention relates to in-situ wellbore measurement and control utilizing inductive connectivity sensors and actuators. The object is to place one or more sensors in order to measure a one or more physical parameters or properties of a formation or a wellbore process. In this case, a wellbore process is a process of producing or injecting from/to a subsurface formation, adjacent to the wellbore, a fluid, a gas, or a combination thereof. Furthermore, another object is to place one or more actuators in order to control a production or injection process of a wellbore. Finally and equally important, another object is to place one or more sources for the physical excitation of the formation, in order to evaluate one or more physical parameters or properties of the formation.

Figure 1:
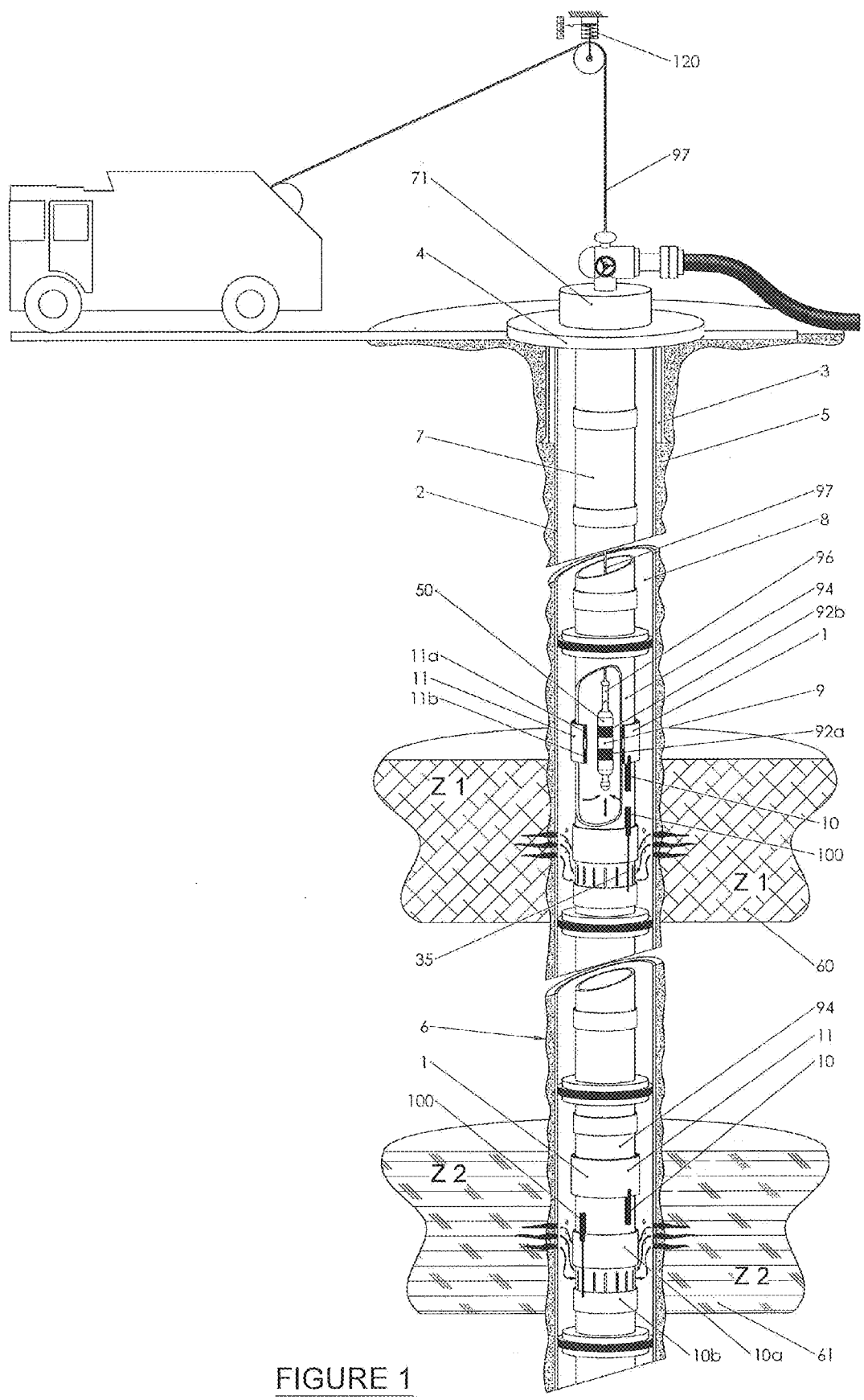
FIG. 1 is a diagrammatic view depicting the Method and Apparatus for In-situ Wellbore Measurement and Control With Inductive Connectivity of the present invention.

The most common or frequent parameters to monitor are the ones of pressure and temperature at a target elevation within a wellbore or formation. Referring to FIG. 1, a Wireless Instrument Unit ("WIU") 1 of the present invention is made part of a wellbore completion program or wellbore conduit 7. In FIG. 1, the wellbore conduit 7 is the process tubing transporting fluid/gas to/from a reservoir or formation within a main production barrier 2. The reference numeral 5 depicts the earth through which the well has been bored, and the reference numeral 6 depicts the wellbore itself. A Tubing Section or joint referred to as a Non-Magnetic Wellbore Conduit ("NMWC") 94 of the WIU 1 is made of a non-magnetic material and hosts the Wireless Instrument Unit ("WIU") 1 including one or more Sensor/Actuator Package ("SAP") 10. The connectivity of the WIU 1 and the SAP 10 a, b . . . is through corresponding WIU 1 antennas 11a and 11b. For the purpose of this illustration the Sensor/Actuator Package 10 a, b . . . is configured to measure and monitor the annular space 8 outside the wellbore conduit 7. As shown in FIG. 1 this annular space 8 is also often referred to as Annulus-A. (This is as differentiated between an annular space 3 often referred to as Annulus B.)

Further relating to real applications, the location or position of the WIU 1 on the wellbore conduit 7 is typically positioned close to an investigation zone 60 or 61 of interest or close to the location of a final element of the wellbore conduit 7 to be monitored or controlled. The WIU 1 is wirelessly powered by an Electromagnetic Transceiver (ET) 9 by an electromagnetic module 100, also referred to as a "power harvesting" module (reference numeral 100 of FIG. 4 or 5) by those who are skilled in the art of electrical engineering. The WIU 1 is provided with supervisory circuits, which enable two-way communications with the ET 9. In turn, the communication is accomplished by electromagnetic means.

Figure 2:
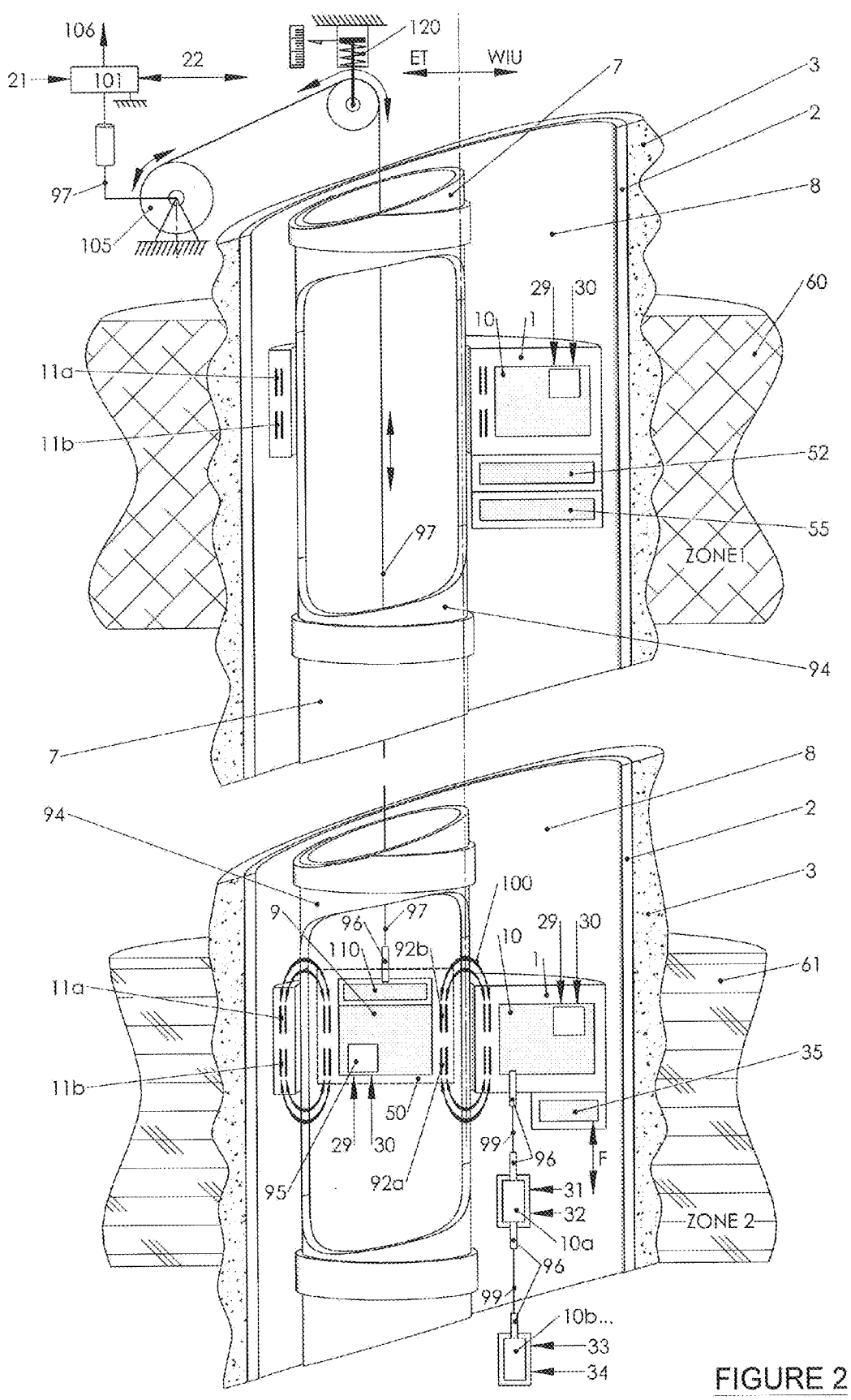
FIG. 2 shows an enlarged diagrammatic view of a first aspect of FIG. 1, depicting the Wireless Instrument Unit ("WIU")

Referring now to FIG. 2, the main elements of one aspect of the present invention are illustrated, and these elements define two configurations of the Wireless Instrument Unit ("WIU") 1 in the wellbore. The WIU 1 consists of: first, a Sensor/Actuator Package ("SAP") 10; second, an Electromagnetic Transceiver ("ET") 11a and 11b; and third, a Non-Magnetic Wellbore Conduit ("NMWC") 94. A more detailed connection and function diagram of the WIU 1 is illustrated on the right hand side of the dotted line of FIGS. 4 and 5.

Referring again to FIG. 1, a second main aspect of the present invention is the Electromagnetic Transceiver ("ET") 9. The ET 9 is typically mounted to an Electric-line Logging Cable ("ELC") 97 which exits at a tubing hanger 71 located above a wellhead structure 4, and is attached to and run by a winch 105, which is typically located at surface or seabed. For the present invention, the electric line cable 97 is attached above ground to an electronic control system referred to as a Downhole Interface Unit ("DIU") 101 (shown in FIG. 2). The DIU 101 is provided with an alert output of a Phase-Locked Loop ("PLL") 106 (shown in FIG. 2) which is provided to guide the winch 105 operator. The PLL 106 allows the operator to adjust the elevation of the Downhole Intervention Tool 50 and consequently the ET 9 so that the ET 9 lands out at the exact same elevation opposing the WIU 1 inside the wellbore conduit 7. This will ensure proper communications as well as providing optimum efficiency of the electromagnetic (power harvesting) module 100 (reference numeral of FIGS. 4 and 5).

Power supply and communications for the ET 9 is provided through the Electric-line Logging Cable 97 which is run inside the wellbore conduit 7. The Electric-line Logging Cable 97 typically enters the wellbore conduit 7 or tubing in the wellhead area. The entry of latter is by traditional well logging means, known to those skilled in the art. The ET 9 may also host a Sensor/Actuator Package 95 (shown in FIG. 3), which in principle is the same as the Sensor/Actuator Package 10 *a, b* . . . of the WIU 1, but it may be configured to read parameters from inside the wellbore conduit 7. Typically, the process tubing or wellbore conduit 7 is often referred to as the Well Completion by those skilled in the art. Further, the well completion may be rather complex and in addition to the features mentioned it may also consist of an assembly of valves, seal units, control lines, and more. But for the purpose of simplicity, all of this is in general attached to one and same wellbore conduit 7. It is mentioned here since this is not considered to be a limitation of this invention.

Figure 3:
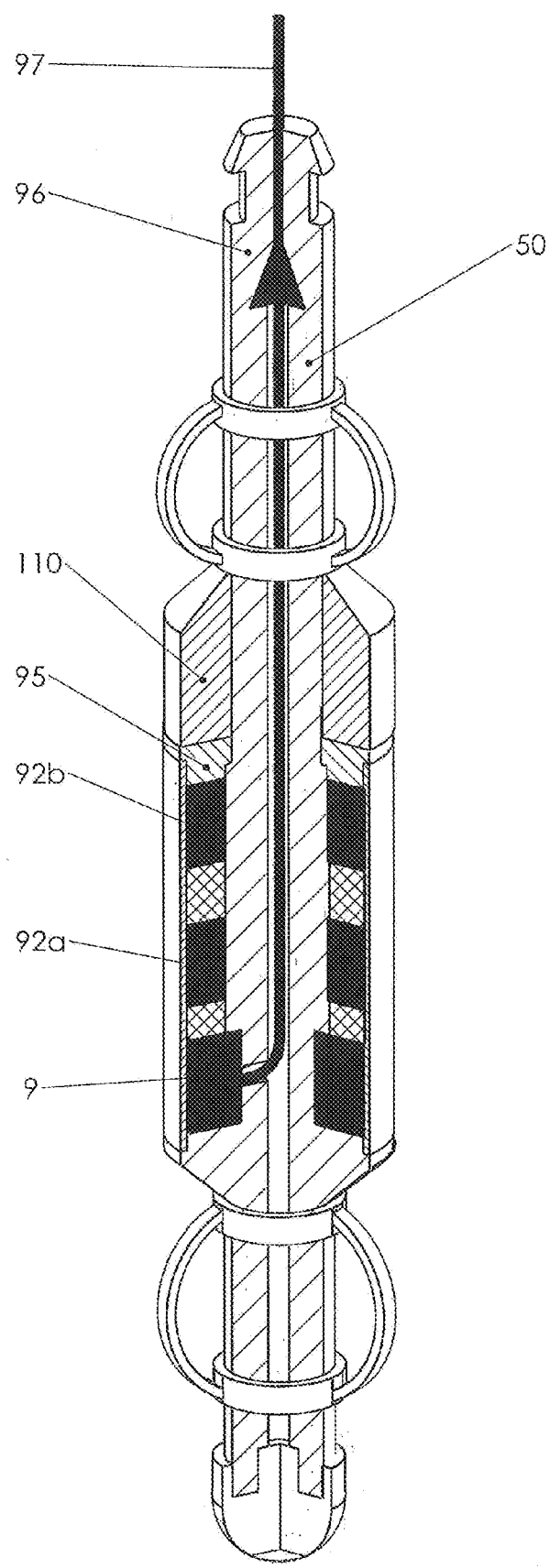
FIG. 3 shows an enlarged diagrammatic view of a second aspect of FIG. 1, depicting the Intervention Tool hosting the Electromagnetic Transceiver ("ET")

Referring now to FIG. 3, this summarizes a second aspect, the ET 9, of the present invention. Power to the ET 9 is provided from the well site mounted Downhole Interface Unit ("DIU") 101 (shown in FIG. 2) through the Electric-line Logging Cable ("ELC") 97. The ELC 97 also hosts the communication in and out of the well between the DIU 101 and the ET 9. Typically the communication is by means of a signal superimposed onto the power since the ELC 97 is a single-conductor armored cable. The ELC 97 is terminated at the ET 9 at the Cable Adaptor 96. Power is routed internally through the Downhole Intervention Tool 50 and connected to the Electromagnetic Armature ("EA") 92. A detailed description of the internal electronic functions and routing is provided in FIGS. 4 and 5, on the left hand side of the dotted line.

Figure 4:
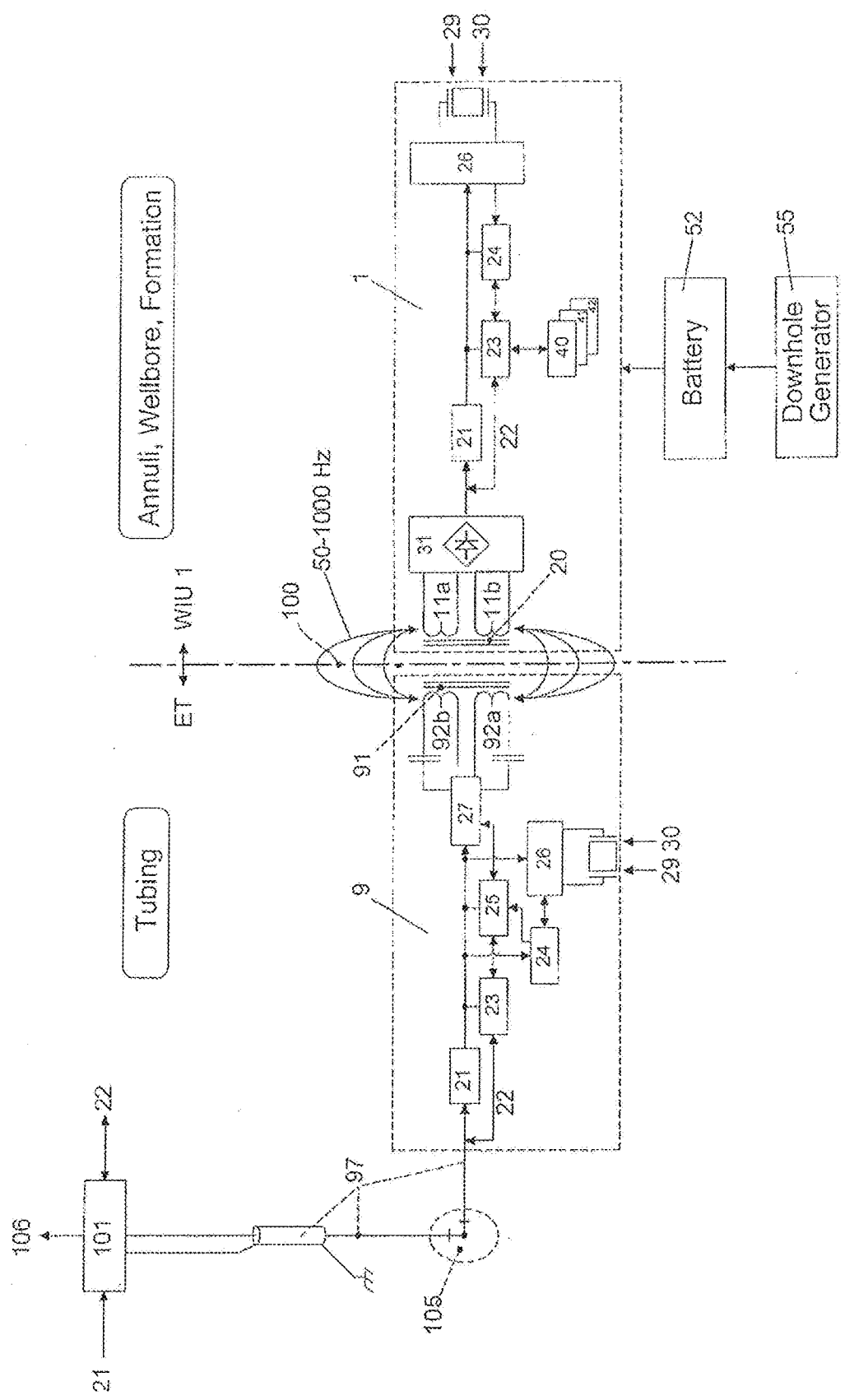
FIG. 4 shows a simplified electrical block diagram of the ET and WIU in accordance with the present invention.
Figure 5:
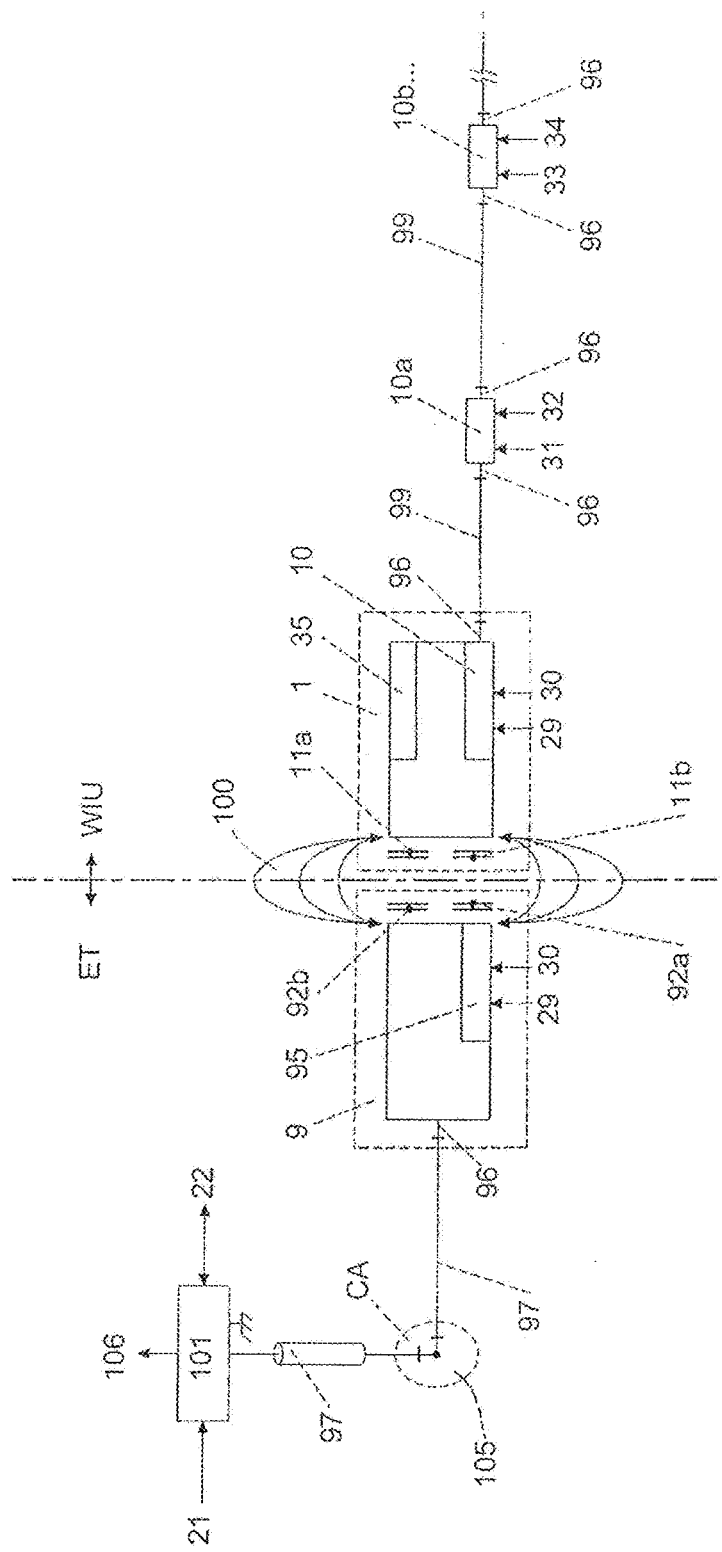
FIG. 5 shows a simplified electrical block diagram of the ET and WIU with multiple SAP's in accordance with the present invention.

As mentioned, the EA 92 and the SAP 95 are attached to the Downhole Intervention Tool 50. The Downhole Intervention Tool ("DIT") 50 serves as a holder and protection for the referenced elements. The alignment of the DIT 50 inside the wellbore conduit 7 is made by the operator running the winch unit 105 at the surface or seabed. Both the ET 9 and the WIU 1 are split into two separate and equal EA sections 11*a* and 11*b* and 92*a* and 92*b*. As illustrated in FIGS. 4 and 5, the antennas are opposed to another when aligned in the wellbore. One section, 11*a*/92*a* marked "a," comprises a Transmit Antenna Tx and the second section, 11*b*/92*b* marked "b," comprises a rectenna Rx or Receive Antenna. More particularly, the alignment of the unit or antennae is performed by tracking of an electronic phase-locked loop that is part of the ET 9.

During a well intervention, the ET 9 is run in a continuous transmit mode. This means that the transmit antenna 92*a* of the ET 9 induces an alternating electromagnetic field 100 at a particular frequency W, which will be recognized by a matching (pre-programmed) WIU 1. Thus, as the ET 9 is aligned with the WIU 1, the transmit field 100 is picked up by the WIU 1 receiving antenna 11*b*, and if the received frequency matches its expectation it is evoked and will transmit a feedback signal using its transmit antenna 11*a*. In turn, as the feedback is picked up by the ET 9 rectenna 92*b*, the loop is closed as the feedback match and tracks the transmittal of the phase-locked loop. Upon "track," meaning that the ET 9 is opposed, a "keyed" or addressed WIU 1, from which the address signal is recognized, the ET 9 transmits a PLL acknowledgement 106 signal via the Electric-line Logging Cable 97 to alert the operator of the unit's alignment. Furthermore, and for the purpose of the invention, a keying or addressing architecture is derived by utilizing a plurality of transmit frequencies. Vice-versa, the frequency keying may be used to evoke a plurality of remote WIU's from which response is correspondingly frequency specific.

The Downhole Intervention Tool 50 may be manufactured in a magnetic material. Further, the WIU units are permanently installed and part of the wellbore conduit 7. In general the wellbore conduit 7 may be made in a magnetic material. However, and for the purpose of this invention, the wellbore conduit section 94 physically holds and function as carrier of the WIU 1, needs to be made in a non-magnetic material as to leave a "magnetic transparent window" for allowing the induced electromagnetic field 100, as induced by the ET 9, to remotely energize the WIU 1.

Now referring to FIG. 4, a simplified electronic block diagram of the present invention is shown and is provided for those skilled in the art in order to visualize the inherent architecture as well as operation of the system. For a more detailed explanation of the various components of the ET 9 and the WIU 1 and their operation, reference may be had to FIG. 4 and the accompanying portions of the specification of U.S. Patent Application Publication No. US 2012/0024050 A1, to Godager, which is assigned to the assignee of the present patent application and is hereby incorporated herein by reference. As may be seen form the block diagram, ET 9 is attached to the ELC 97 and makes connectivity to an opposed WIU 1. In a multi-unit system, i.e., two or more SAP 10 *a, b* . . . , units are connected to a common WIU 1. The SAP 10 units are connected and powered through separate or a common Tubing Encapsulated Cable 99 (shown in FIG. 5) which also provides for the communications. The ET 9 is run by a winch 105 and by utilizing a PLL alert 106 the correct location and alignment of the ET 9 versus the WIU 1 is found.

Due to relatively high power consumption, the nature of the system is also that only one SAP 10 is active at a time. This is in the case if two or more SAP's are attached to the Tubing Encapsulated Cable 99. The active status of an ET 9, and the setup of a "keying" address for the WIU 1 to interrogate in the wellbore, is set up during the initial start-up and through a command issued by the DIU 101. During interrogation, the DIU 101 actively addresses the SAP 10 *a, b*, . . . unit of interest, and makes it the active node or device of the network. To change to another SAP unit, the DIU 101 simply powers-down the line to reset, resume, and continue to the next SAP unit. Moreover, at the next power-up another SAP 10 unit than the one previous interrogated may be serviced. By this mode of addressing, power is directed to one SAP unit at the time, and the system is capable of hosting numerous of SAP units on a common or separate network line 99 without a gross voltage drop on the cable due to heavy loads.

Further, it is to be mentioned that the power harvesting referenced in FIGS. 4 and 5 by the reference numeral 100 is achieved by correct vertical alignment of the ET 9, relative to the WIU 1. As mentioned this alignment is provided by running the winch 105 or, alternative tractor operation if in a grossly deviated wellbore section. A second feature of this invention is the use of a non-magnetic wellbore conduit section ("NMWC") 94 which makes the lower frequency (50 Hz-1000 Hz) electromagnetic field induced by the Electromagnetic Armature ("EA") 92 deep penetrating, and thus visible to the WIU 1. While the efficiency of the power transfer is poor due to non-ideal conditions of the induction coupling, however tests show that a ratio in the range of 20:1 is achievable and is sufficient to operate a low-power sensor package as described in the present invention.

Further, and an additional feature of the invention, is the use of the non-magnetic wellbore conduit section 94 since the non-magnetic signature as picked up by a magnet device 110 attached to the Downhole Intervention Tool 50 may be used to find the exact location and to correctly align the ET 9 with the WIU 1. During operation in the magnetic portion of the wellbore conduit 7, a frictional force will be induced due to magnetic contraction between the magnet device 110 of the Downhole Intervention Tool 50 and the magnetic sections of the wellbore conduit 7. In turn, the magnetic force inducement will appear on a winch weight indicator 120 at surface. As the tool enters the non-magnetic "signature" section, the force component induced by magnetic contraction will fade out, thus, changing the apparent tension of the ELC 97. The pull change or force difference is monitored by the weight indicator 120 of the operator and is a "signature" to tell that the Intervention Tool and the ET 9 is close to target position inside the wellbore conduit 7.

In detail the ET 9 consists of a Power Supply (PS) that provides a regulated DC for the electronic functions of the unit. The ET 9 is supervised by an internal Controller ("C"). At power-up, the Controller initiates the download "keying" or address-frequency followed by turning on the internal Modulating Chopper Oscillator ("MCO"). The MCO converts electrical energy into an alternating magnetic induced field 100 through the Electromagnetic Armature ("EA") 92. The induced field 100 has a frequency equal to that of the WIU 1 to address and is within an appropriate range of 50 Hz-1000 Hz, that enables the inducement of electromagnetic waves that propagate deeply into surrounding structures 60 or 61, and hence is picked up by the Rectenna 11b of the WSU 1. The MCO also assists to modulate data in between the ET 9 and the WIU 1. The ET 9 also has a Modem (M). The main purpose of the Modem is to read and transmit data from/to the ELC 97. However, data in/out of the ET 9 is buffered and interpreted by the internal Controller C. For the example, the Crystal Sensors of the described device are driven by the respective Oscillators ("OSC") and each sensor crystal provides a frequency output as function of its measurand. The sensor frequency is measured by the Signal Processor ("SP") and is continuously fed to an input buffer of the Controller C.

For the WIU 1, the internal electronic functions are almost equal to the ET 9, with the exception of the Rectifying Bridge ("RB"). The Rectifying Bridge converts the alternating current induced by the local electromagnetic field into a DC voltage/current that internally powers the WIU 1 and corresponding SAP 10 a, b, . . . . The prescribed electromagnetic principle used, is, by state-of-the-art, referred to as Power Harvesting 100. For the purpose of the example chosen to illustrate this invention, the WIU 1 is provided with highly accurate pressure/temperature sensors and a valve actuator. In principle, the WIU 1 may include a Sensor/Actuator Package 10 that may hold any kind of sensors 29, 30, 31, 32, 33, 34, . . . , and actuators 35, 36, 37, . . . , and combinations thereof, to measure and to control a plurality of measurement parameters within the wellbore conduit 7, outside 8 the wellbore completion process, or in a boundary formation or reservoir 60, 61.

In applications where it is desirable to have the WIU 1 operating autonomously in the wellbore, the WIU 1 operation may be supported with an internal or external energy source 52. The source may be any means of a primary or secondary source battery technology. Further, for the service of the WIU 1 in an autonomous mode, or for the service of the battery 52, the WIU 1 may be supported by an electrical downhole generator converting energy from the process or related physical property into electrical energy supporting the WIU 1, the battery 52, or both. Finally, in an autonomous mode application, the WIU 1 and the corresponding SAP 10 may be provided with memory 40, 41, 42, . . . in order to store data with time or by event in the wellbore. The content of the memory may be read, edited during interrogation using the Intervention Tool 50, and downloaded to a computer at the surface via the DIU 101 and a data communication port 22 for detailed interpretation and analysis. For those skilled in instrumentation, any type of data memory technology may be used for storing information obtained by of the SAP 10.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. An apparatus for in-situ wellbore measurements, the apparatus comprising:
   one or more sensors arranged outside a wellbore;
   one or more actuators associated with the sensors;
   an electromagnetic transceiver situated inside a wellbore conduit and mounted on an electric-line logging cable, wherein the transceiver has a first transmission antenna and a first receiver antenna spaced apart from the first transmission antenna;
   at least one wireless instrument unit situated outside a non-magnetic portion of the wellbore conduit and operatively connected to the one or more sensors and the one or more actuators wherein the wireless instrument unit has a second transmission antenna and a second receiver antenna spaced apart from the second transmission antenna; and
   a downhole interface unit also located on the electric-line cable for controlling communication to the apparatus.

2. An apparatus as defined in claim 1, in which the sensors and the actuators have their own separate power source.

3. An apparatus as defined in claim 2, in which the separate power source comprises:
   a battery, a super capacitor, a downhole generator, or a combination thereof.

4. An apparatus as defined in claim 1, in which the sensors and the actuators are powered by electromagnetic energy passing from the electromagnetic transceiver located within the wellbore.

5. An apparatus as defined in claim 1, in which the one or more sensors and the one or more-actuators are controlled by the single electromagnetic transceiver which may be raised or lowered within the wellbore.

6. An apparatus as defined in claim 1, in which the electromagnetic transceiver comprises:
an electromagnetic armature acting as a power source and a communications link; and
a cable adaptor to connect the electric-line logging cable to the electromagnetic transceiver.

7. An apparatus as defined in claim 1, wherein the one or more sensors measure one or more properties selected from the group consisting of:
resistivity, multi-axis seismic, radiation, pressure, temperature, conductivity, electric field, magnetic field, capacitance, chemical composition, water saturation, water contacts, flow rate, flow direction, flow composition, flow valve position, flow valve actuation, temperature profile, thermal conductivity, sand content, turbidity, water level, and control of downhole artificial gas lift valves.

8. An apparatus as defined in any claim 1, wherein the one or more sensors and the associated actuator units are arranged in series, with each sensor measuring one or more predetermined properties.

9. An apparatus as defined in claim 1, wherein either or both of the electromagnetic transceiver and the downhole interface unit further comprises data storage means.

10. An apparatus as defined in claim 1, wherein the electromagnetic transceiver further comprises:
a modem to read and transmit data to and from the electric-line cable.

11. An apparatus as defined in claim 10, wherein the electromagnetic transceiver additionally comprises:
an internal control apparatus to buffer and interpret data prior to transmission.

12. An apparatus for in-situ wellbore measurements, the apparatus comprising:
one or more sensors arranged outside a wellbore;
one or more actuators associated with the sensors;
an electromagnetic transceiver situated inside a wellbore conduit and mounted on an electric-line logging cable;
at least one wireless instrument unit situated outside a non-magnetic portion of the wellbore conduit and operatively connected to the one or more sensors and the one or more actuators; and
a downhole interface unit also located on the electric-line cable for controlling communication to the apparatus, wherein both the electromagnetic transceiver and the wireless instrument unit each include a transmission antenna and a receiver antenna.

13. A method of in-situ wellbore measurements comprising:
positioning outside a wellbore conduit in an annulus of the wellbore a wireless instrument unit having a second transmission antenna and a second receiver antenna spaced apart from the second transmission antenna;
positioning within the wellbore conduit an electromagnetic transceiver at a desired position inside the wellbore using the electric-line logging cable, wherein the transceiver has a first transmission antenna and a first receiver antenna spaced apart from the first transmission antenna;
providing a signal via the electric-line logging cable to induce an electromagnetic transmission from the first transmission antenna of the electromagnetic transceiver to the second receiver antenna of the wireless instrument unit;
if the electromagnetic transceiver is aligned with the wireless instrument unit, sending a signal from the second transmission antenna of the wireless instrument unit to the first receiver antenna of the electromagnetic transceiver; utilizing one or more sensors and the one or more actuators deployed outside the wellbore conduit to measure at least one predetermined property; and
transferring the sensor data wirelessly from the wireless interface unit to the electromagnetic transceiver.

14. A method as defined in claim 13, further comprising changing one or more sensors used to measure at least one predetermined property by application of a new alternating electromagnetic field at a predetermined frequency transmitted from the electromagnetic transceiver to the wireless interface unit.

15. A method as defined in claim 13, wherein the power for running the sensor and actuator unit operating the wireless interface unit, the one or more sensors, and the one or more actuators is transferred wirelessly across the wellbore by electromagnetic means.

16. A method as defined in claim 13, wherein the sensor and actuator unit is wireless interface unit, the one or more sensors, and the one or more actuators are powered by an independent power supply.

17. A method as defined in claim 13, wherein the sensor is one or more sensors are configured and arranged to measure at least one or more of the properties selected from the following list: group consisting of:
temperature, temperature difference, pressure, differential pressure, vibration, chock, electric field, magnetic field, acceleration, load, displacement means, acoustic type, resistivity, relative humidity, thermal conductivity, pH, electrical potential ac/dc, electrical current ac/dc, tension, compression, torque, sheer force, inclination, magnetic orientation, tool face, gravity, flow, turbidity, density, displacement, dimension, radiation, speed, frequency, weight, buoyancy, ratiometric type, electrical event type, and ambient conditions.

18. A method as defined in claim 13, further comprising closing of a phase-locked loop upon alignment of the first transmission antenna of the electromagnetic transceiver with the second receiver antenna of the wireless instrument unit and alignment of the second transmission antenna of the wireless instrument unit with the first receiver antenna of the electromagnetic transceiver.

19. A method as defined in claim 18, wherein the one or more sensors are activated upon closing of the phase-locked loop.

20. An apparatus for in-situ wellbore measurements, the apparatus comprising:
a wireless instrument unit comprising a first electromagnetic transceiver, the wireless instrument positioned in an annulus outside of a non-magnetic portion of a wellbore conduit, the first electromagnetic transceiver having a second transmission antenna and a second receiver antenna spaced apart from the second transmission antenna, the wireless instrument unit being operatively connected to a first set of one or more sensors arranged outside the wellbore conduit and to a first set of one or more actuators arranged outside the wellbore conduit;
an intervention tool positioned inside the wellbore conduit and mounted on an electric-line logging cable, the intervention tool for selective placement in the wellbore conduit, the intervention tool comprising a second electromagnetic transceiver having a first transmission antenna and a first receiver antenna spaced apart from the first transmission antenna, the second electromagnetic transceiver for communication with the first electromagnetic transceiver when the intervention tool is positioned with the electric-line logging cable at a location wherein the first transmission antenna and a first receiver antenna are respectively aligned with the second transmission antenna and a second receiver antenna on opposite sides of the non-magnetic portion of the wellbore conduit; and a downhole interface unit carried by the electric-line cable for controlling communication with the wireless instrument unit to selectively obtain information from the one or more sensors arranged outside the wellbore conduit and to selectively operate the one or more actuators arranged outside the wellbore conduit.

21. An apparatus as defined in claim 20, further comprising:

a second wireless instrument unit comprising a third electromagnetic transceiver, the wireless instrument positioned in the annulus outside of a second non-magnetic portion of a wellbore conduit, the third electromagnetic transceiver having a second transmission antenna and a second receiver antenna spaced apart from the second transmission antenna, the second wireless instrument unit being operatively connected to a second set of one or more sensors arranged outside the wellbore conduit and to a second set of one or more actuators arranged outside the wellbore conduit.

22. A method of making in-situ wellbore measurements, comprising:

installing at least one wireless instrument unit outside of a non-magnetic portion of a wellbore conduit, the at least one wireless instrument unit being operatively connected to one or more sensors arranged outside the wellbore conduit and to one or more actuators arranged outside the wellbore conduit, the wireless instrument unit comprising a first electromagnetic transceiver having a second transmission antenna and a second receiver antenna spaced apart from the second transmission antenna;

suspending an intervention tool inside the wellbore conduit from an electric-line logging cable, the intervention tool having a second electromagnetic transceiver having a first transmission antenna and a first receiver antenna spaced apart from the first transmission antenna, the first transmission antenna and the first receiver antenna for communication with the second transmission antenna and the second receiver antenna of the first electromagnetic transceiver adjusting the position of the intervention tool suspended on the electric-line logging cable to a location wherein the first and second electromagnetic transceivers are located adjacent each other on opposite sides of the non-magnetic portion of the wellbore conduit so that the first transmission antenna and the first receiver antenna are respectively aligned with the second transmission antenna and the second receiver antenna; and communicating between a downhole interface unit carried by the electric-line cable to selectively obtain information from the one or more sensors arranged outside the wellbore conduit and to selectively operate the one or more actuators arranged outside the wellbore conduit.

\* \* \* \* \*